US011607633B2

(12) United States Patent
Malgorn

(10) Patent No.: US 11,607,633 B2
(45) Date of Patent: Mar. 21, 2023

(54) FILTRATION SYSTEM WITH AUTOMATIC DRAIN PLUG

(71) Applicant: CUMMINS FILTRATION SARL, Quimper (FR)

(72) Inventor: Gérard Malgorn, Quimper (FR)

(73) Assignee: CUMMINS FILTRATION SARL, Quimper (FR)

( * ) Notice: Subject to any disclaimer, the term of this patent is extended or adjusted under 35 U.S.C. 154(b) by 357 days.

(21) Appl. No.: 17/060,799

(22) Filed: Oct. 1, 2020

(65) Prior Publication Data
US 2021/0016211 A1     Jan. 21, 2021

Related U.S. Application Data

(63) Continuation of application No. 16/005,078, filed on Jun. 11, 2018, now Pat. No. 10,799,819.

(51) Int. Cl.
*B01D 35/16* (2006.01)
*B01D 29/11* (2006.01)
(Continued)

(52) U.S. Cl.
CPC ............ *B01D 35/16* (2013.01); *B01D 29/114* (2013.01); *B01D 29/902* (2013.01);
(Continued)

(58) Field of Classification Search
CPC .. B01D 35/005; B01D 35/147; B01D 35/153; B01D 35/16; B01D 35/30;
(Continued)

(56) References Cited

U.S. PATENT DOCUMENTS 2,856,075 A * 10/1958 Kahl .................. B01D 29/54
                                                    210/429
3,745,753 A    7/1973 Risse
                (Continued)

FOREIGN PATENT DOCUMENTS

CN      2609635 Y     4/2004
CN    102958581 A     3/2013
(Continued)

OTHER PUBLICATIONS

First Office Action for Chinese Patent App. No. 200880020548.5 dated Jan. 31, 2012, 5 pages (with English translation).
(Continued)

*Primary Examiner* — Patrick Orme
(74) *Attorney, Agent, or Firm* — Foley & Lardner LLP

(57) ABSTRACT

A filtration system includes a housing and a filter element positioned within the housing. The housing includes a first housing end and a second housing end. A drain opening is defined in the second housing end. The filter element includes a first endplate and a second endplate defining an endplate opening. Filter media is positioned between and extending axially between the first endplate and the second endplate. The filter media defines a central opening extending axially therein. A drain plug axially protrudes from the second endplate in a direction away from the filter media. The drain plug is configured to engage the drain opening and facilitate installation of the filter element into the housing. A lid is configured to engage the first housing end. The engagement between the lid and the first housing end occurs when the drain plug is disposed within the drain opening.

20 Claims, 8 Drawing Sheets

(51) Int. Cl.
*B01D 29/90* (2006.01)
*B01D 35/30* (2006.01)
*F02M 37/32* (2019.01)
*B01D 35/00* (2006.01)
*F02M 37/24* (2019.01)
*F02M 37/54* (2019.01)

(52) U.S. Cl.
CPC ........... *B01D 35/005* (2013.01); *B01D 35/30* (2013.01); *F02M 37/24* (2019.01); *F02M 37/32* (2019.01); *B01D 2201/295* (2013.01); *B01D 2201/301* (2013.01); *B01D 2201/304* (2013.01); *B01D 2201/4046* (2013.01); *B01D 2201/4092* (2013.01); *F02M 37/54* (2019.01)

(58) Field of Classification Search
CPC ........ B01D 2201/291; B01D 2201/295; B01D 2201/301; B01D 2201/4046; B01D 2201/4053; B01D 2201/4061; B01D 2201/4092; B01D 29/114; B01D 29/902; F01M 11/03; F02M 37/24; F02M 37/32; F02M 37/54; F16N 39/06
See application file for complete search history.

(56) References Cited

U.S. PATENT DOCUMENTS

| | | |
|---|---|---|
| 3,920,553 A | 11/1975 | Cilento |
| 3,928,007 A | 12/1975 | Jackson |
| 4,020,783 A | 5/1977 | Anderson et al. |
| 4,619,764 A | 10/1986 | Church et al. |
| 4,906,365 A | 3/1990 | Baumann et al. |
| 5,098,559 A | 3/1992 | Mack et al. |
| 5,468,386 A | 11/1995 | Ardes |
| 5,520,801 A | 5/1996 | Gerber et al. |
| 5,718,825 A | 2/1998 | Greive et al. |
| 5,882,367 A | 3/1999 | Morgan et al. |
| 5,888,384 A | 3/1999 | Wiederhold et al. |
| 5,902,479 A | 5/1999 | Fukumori et al. |
| 6,015,492 A | 1/2000 | Popoff et al. |
| 6,068,762 A | 5/2000 | Stone et al. |
| 6,146,433 A | 11/2000 | Bitner |
| 6,258,143 B1 | 7/2001 | Carawan et al. |
| 6,280,493 B1 | 8/2001 | Eubank |
| 6,308,836 B1 | 10/2001 | Guichaoua et al. |
| 6,402,798 B1 | 6/2002 | Kallsen et al. |
| 6,506,303 B1 | 1/2003 | Gustafsson et al. |
| 6,543,625 B1 | 4/2003 | Le Roux et al. |
| 6,565,746 B1 | 5/2003 | Stamey et al. |
| 6,585,889 B2 | 7/2003 | Weingaertner |
| 6,706,181 B1 | 3/2004 | Baumann et al. |
| 6,709,576 B2 | 3/2004 | Jokschas |
| 6,833,066 B2 | 12/2004 | Baumann et al. |
| 6,835,305 B1 | 12/2004 | Baumann et al. |
| 6,902,598 B2 | 6/2005 | Gunderson et al. |
| 6,910,692 B2 | 6/2005 | Malone et al. |
| 6,936,169 B2 | 8/2005 | Baumann et al. |
| 6,958,083 B1 | 10/2005 | Schmitz et al. |
| 6,972,092 B1 | 12/2005 | Roll |
| 7,060,184 B2 | 6/2006 | Cline et al. |
| 7,297,255 B2 | 11/2007 | Stockbower |
| 7,390,407 B2 | 6/2008 | Weindorf et al. |
| 7,537,631 B2 | 5/2009 | Scott et al. |
| 7,572,306 B2 | 8/2009 | Hawkins et al. |
| 7,585,345 B2 | 9/2009 | Smasal et al. |
| 7,740,678 B2 | 6/2010 | Gunderson et al. |
| 7,833,305 B1 | 11/2010 | Studer |
| 7,871,517 B2 | 1/2011 | Komine et al. |
| 7,887,701 B2 | 2/2011 | Schmid et al. |
| 7,998,251 B2 | 8/2011 | Pondelick et al. |
| 8,099,999 B2 | 1/2012 | Nakano |
| 8,168,066 B2 | 5/2012 | Wieczorek et al. |
| 8,375,925 B2 | 2/2013 | Ichikawa et al. |
| 8,726,876 B2 | 5/2014 | Kobayashi et al. |
| 8,784,523 B2 | 7/2014 | Coulonvaux et al. |
| 8,821,734 B2 | 9/2014 | Grass et al. |
| 8,828,114 B2 | 9/2014 | Dhiman et al. |
| 8,845,897 B2 | 9/2014 | Wieczorek et al. |
| 9,562,449 B2 | 2/2017 | Gao et al. |
| 9,718,010 B2 | 8/2017 | Byun et al. |
| 2002/0100720 A1 | 8/2002 | Jainek |
| 2002/0108897 A1 | 8/2002 | Pavlin et al. |
| 2003/0127384 A1 | 7/2003 | Kapur |
| 2004/0093859 A1 | 5/2004 | Schmeichel et al. |
| 2004/0139572 A1 | 7/2004 | Kisela et al. |
| 2004/0206682 A1 | 10/2004 | Hamlin et al. |
| 2005/0193695 A1 | 9/2005 | Holmes et al. |
| 2005/0279958 A1 | 12/2005 | Baumann |
| 2006/0118475 A1 | 6/2006 | Girondi |
| 2006/0118476 A1 | 6/2006 | Weindorf et al. |
| 2006/0207948 A1 | 9/2006 | Hacker et al. |
| 2007/0215561 A1 | 9/2007 | Yates et al. |
| 2008/0190082 A1 | 8/2008 | Scott et al. |
| 2008/0289305 A1 | 11/2008 | Girondi |
| 2010/0122952 A1 | 5/2010 | South et al. |
| 2010/0146917 A1 | 6/2010 | Coulonvaux et al. |
| 2011/0308212 A1 | 12/2011 | Ruhland et al. |
| 2011/0315126 A1 | 12/2011 | Yoshida et al. |
| 2012/0067014 A1 | 3/2012 | Dhiman et al. |
| 2013/0025557 A1 | 1/2013 | Chlystek et al. |
| 2013/0043176 A1 | 2/2013 | Johnson et al. |
| 2013/0213235 A1 | 8/2013 | Da Silva et al. |
| 2014/0373714 A1 | 12/2014 | Cloud et al. |
| 2016/0177890 A1 | 6/2016 | Kobayashi et al. |
| 2017/0028324 A1 | 2/2017 | Komiyama et al. |
| 2017/0368487 A1 | 12/2017 | Bannister et al. |
| 2019/0217237 A1 | 7/2019 | Cloud et al. |

FOREIGN PATENT DOCUMENTS

| | | |
|---|---|---|
| DE | 35 38 589 A1 | 5/1987 |
| DE | 19646350 C2 | 7/2000 |
| DE | 19524417 C2 | 4/2001 |
| DE | 10064482 A1 | 7/2002 |
| DE | 44 44 934 B4 | 5/2004 |
| DE | 69726690 T2 | 10/2004 |
| DE | 19650185 B4 | 11/2007 |
| DE | 60317288 T2 | 8/2008 |
| EP | 0 781 586 A2 | 12/1996 |
| EP | 1 256 707 A2 | 11/2002 |
| EP | 1 616 611 A1 | 1/2006 |
| EP | 1 974 786 A1 | 10/2008 |
| EP | 2 263 772 A1 | 12/2010 |
| EP | 2 336 510 A1 | 6/2011 |
| EP | 2 337 618 A1 | 6/2011 |
| EP | 3 034 823 A1 | 6/2016 |
| JP | 09-010515 A | 1/1997 |
| JP | 2004-167295 A | 6/2004 |
| KR | 10-2005-0032337 A | 4/2005 |
| KR | 10-2006-0069636 A | 6/2006 |
| WO | WO-02/20132 A2 | 3/2002 |
| WO | WO-2004/069373 A1 | 8/2004 |
| WO | WO-2007/043669 A1 | 4/2007 |
| WO | WO-2017/108483 A1 | 6/2017 |

OTHER PUBLICATIONS

First Office Action for Chinese Patent App. No. 201580067749.0 dated Aug. 28, 2018, 14 pages (with English translation).
International Search Report & Written Opinion for PCT/US2008/067328, dated Dec. 30, 2008, 8 pages.
International Search Report & Written Opinion for PCT/US2015/066579 dated Feb. 26, 2016, 12 pages.
Non-Final Office Action issued for U.S. Appl. No. 15/535,189, dated Feb. 20, 2020, 25 pages.
Notice of Allowance on U.S. Appl. No. 15/535,189 dated Sep. 25, 2020.
Office Action for German Patent App. No. 112007001880.1 dated Feb. 6, 2018, 23 pages (with English translation).
Office Action for German Patent App. No. 112008001571.6 dated Mar. 1, 2016, 12 pages (with English translation).

(56) References Cited

OTHER PUBLICATIONS

International Search Report and Written Opinion issued forPCT/US2007/075508, dated Dec. 2, 2007, 8 pages.

* cited by examiner

FILTRATION SYSTEM WITH AUTOMATIC DRAIN PLUG

CROSS-REFERENCE TO RELATED APPLICATIONS

The present application is a Continuation of U.S. patent application Ser. No. 16/005,078, filed Jun. 11, 2018. The contents of this application are incorporated herein by reference in their entireties.

FIELD

The present application relates generally to fuel or lube filter systems.

BACKGROUND

Internal combustion engines generally combust a mixture of fuel (e.g., diesel, gasoline, natural gas, etc.) and air. Prior to entering the engine, the fuel is typically passed through a filter element to remove particulate matter (e.g., dust, metal particles, debris, etc.) from the fuel prior to combustion. Similarly, lubricant or lube (e.g., engine oil) provided to the engine may also be passed through a filter element so as to remove particulate matter from the lube before communicating to the engine. The fuel may include water, which may accumulate in the filter and may have to be removed. The operation of the drain functions properly when dirty fluid (e.g., oil or fuel) is prevented from passing to the clean side during servicing. For top load filtration systems, an issue arise during installation of a new filter element as dirty fluid can travel back with the water to the fuel tanks if 100% of the fluid is drained from the housing.

SUMMARY

Embodiments of this disclosure relate generally to an automatic drain system for fuel water separator filter systems. More specifically, embodiments relate to an automatic drain system that includes electronic sensors to automatically drain water from a fuel water separator filter system without active involvement of the user.

Various embodiments relate to a filtration system. The filtration system includes a housing and a filter element positioned within the housing. The housing includes a first housing end and a second housing end. A drain opening is defined in the second housing end. The filter element includes a first endplate and a second endplate defining an endplate opening. Filter media is positioned between and extending axially between the first endplate and the second endplate. The filter media defines a central opening extending axially therein. A drain plug axially protrudes from the second endplate in a direction away from the filter media. The drain plug is configured to engage the drain opening and facilitate installation of the filter element into the housing. A lid is configured to engage the first housing end. The engagement between the lid and the first housing end occurs when the drain plug is disposed within the drain opening. Engagement of the lid and the first housing end is prevented from occurring when the filter element is positioned within the housing but the drain plug is not disposed within the drain opening Another example embodiment relates to a filter element. The filter element includes a first endplate and a second endplate defining an endplate opening. Filter media is positioned between and extending axially between the first endplate and the second endplate. The filter media defines a central opening extending axially therein. A drain plug axially protrudes from the second endplate in a direction away from the filter media. The drain plug is configured to engage the drain opening and facilitate installation of the filter element into the housing. A baffle is disposed on the second endplate. The baffle protrudes axially from the second endplate towards the first endplate and the baffle extending radially around a portion of a perimeter of the second endplate.

Another example embodiment relates to a method of installing a filter element into a housing. The method begins with providing a housing. The housing includes a first housing end, a second housing end and a housing opening between the first housing end and the second housing end, the second housing end defining a drain opening. A filter element is provided. The filter element includes a first endplate and a second endplate defining an endplate opening. Filter media is positioned between and extending axially between the first endplate and the second endplate. The filter media defines a central opening extending axially therein. A drain plug axially protrudes from the second endplate in a direction away from the filter media. The filter element is placed within housing opening of the housing. The drain plug is aligned with the drain opening. The drain plug is inserted within the drain opening such that the filter element is fully disposed and installed within the housing.

These and other features, together with the organization and manner of operation thereof, will become apparent from the following detailed description when taken in conjunction with the accompanying drawings, wherein like elements have like numerals throughout the several drawings described below.

Figure 1:
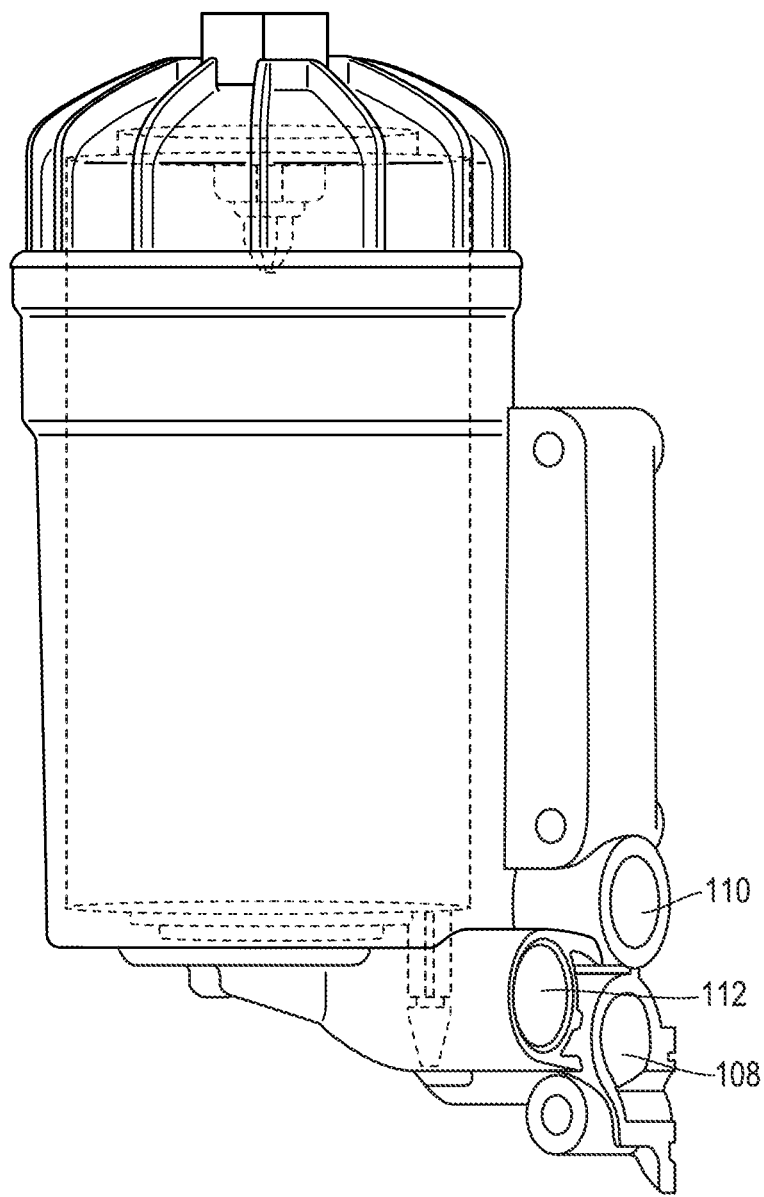
FIG. 1 is a side view of a filtration system with an automatic drain plug in a filter element according to an example embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Referring to the figures generally, a filtration system having an automatic drain plug provided on a bottom endplate of a filter element and a complementary drain opening in the housing is described. The automatic drain plug is configured for removing dirty fluid (e.g., unfiltered fuel or oil) accumulated in a filter during the filter element servicing and to plug the drain opening during operation of the filtration system. The automatic drain plug can be implemented with a wide variety of automatic drain plug lengths and at a wide variety of locations along the bottom endplate to provide a "poke yoke" of the filter element in the filtration system. Due to the shape and location of the automatic drain plug, the housing does not need a special shape of runway, as the automatic drain plug allows for a simplified drain opening in the housing. The filter element further includes a baffle adjacent to an inlet of the housing that prevents the incoming flow from directly contacting the outside surface of the filter media of the filter element. The baffle is configured to be positioned from the automatic drain plug in a way that aligns the baffle with the inlet of the housing. Beneficially, the automatic drain plug is configured to drain substantially all of the fuel during servicing in order to prevent dirty fuel from going to the clean side. When the filter element is removed, a dedicated line is configured to facilitate the fuel to return to the tank. Generally, embodiments of the automatic drain plug described herein may provide benefits including, for example: (1) providing automatic draining of water accumulated in a filter housing of a filter assembly; (2) preventing atmospheric air from entering the filter housing; and (3) preventing fuel from escaping a filter housing.

Referring to FIG. 1, a filtration system 100 including a housing 104 with an inlet 110 and outlet 112, a filter element 102 disposed within the housing 104 (shown as an outline), a lid 106, and a drain 108 are shown, according to an example embodiment. Generally, the filter element 102 is keyed to the housing 104 allowing a protrusion (e.g., a drain plug) on the filter element 102 to be received in a drain opening of housing 104. Additionally, the drain plug on the filter element 102 is keyed to the lid 106 such that the lid 106 properly engages the housing 104 only if the length of the drain plug is correct in relation to the length of the engagement thread on the lid 106. As will be appreciated, a proper filter element 102 having the right size and location of the drain plug will fully engage the drain opening on the housing 104 and allow for the lid 106 to be installed on the housing 104.

The lid 106 includes a radial seal member 152 and a threaded lid member 150 configured to engage a complementary threaded housing member 146 on the first housing end 140 of the housing 104. The radial seal member 152 forms a seal between the housing 104 and the lid 106. In some embodiments, the radial seal member 152 may be produced by an O-ring or other resilient seal. In some embodiments, the threaded engagement of the threaded lid member 150 and the threaded housing member 146 may be clamped in the desired relative location. The threaded lid member 150 can be a wide variety of lengths in order to achieve the desired keying (e.g., poke yoke) feature of the filter element 102. Generally, the filtration system 100 is configured such that the lid 106 can only properly engage and seal with the housing 104 when the drain plug 126 is properly disposed in the drain opening 148. Consequently, and as described below in greater detail in FIG. 5B, the length of the threaded lid member 150 is shorter than the length of the drain plug 126 of the filter element 102.

The housing 104 includes a first housing end 140, a second housing end 142, and a housing body 109. The first housing end 140 includes a threaded housing member 146 that is configured to receive a complementary threaded lid member 150 from the lid 106. The housing body 109 includes the inlet 110, the outlet 112, and a central compartment 144 that receives the filter element 102. In some embodiments, the housing 104 may include one or more vents that expose the interior of the housing to the outside environment. The vents may be configured such that vapor or gas present in the interior of the lower housing may pass to the outside environment. The interior of the housing 104 may include an absorbent media. The absorbent media may be any appropriate material, such as sponge or activated carbon. The absorbent media may serve to absorb fluid drained from the filtration system, such that the fluid may evaporate through over an extended period of time.

Figure 2:
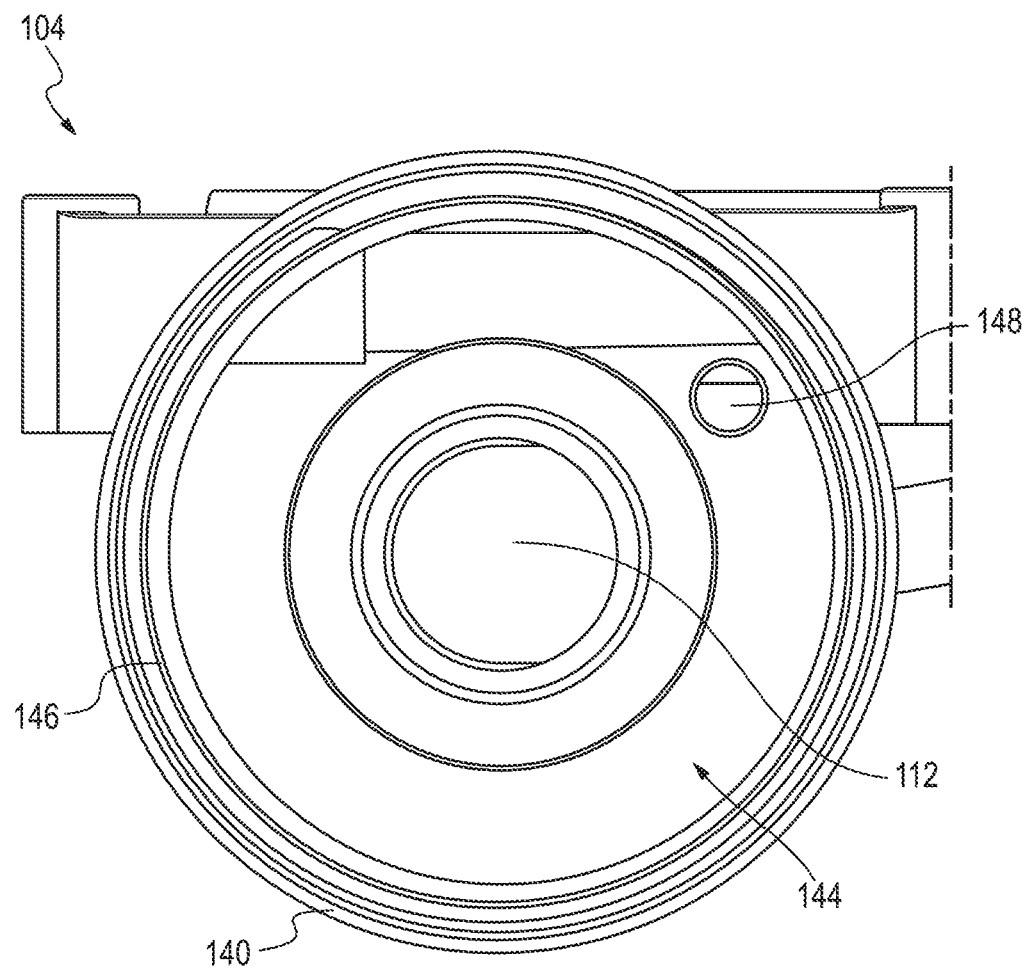
FIG. 2 is a cross-sectional top view of a housing of the filtration system of FIG. 1.

The central compartment 144 of the housing 104 includes a drain opening 148 defined in the second housing end 142. In the embodiment depicted in FIG. 1, the second housing end 142 is substantially flat and does not include ramp features that provide poke yoke installation assistance. The drain opening 148 is in fluid communication with the drain 108. As shown in FIG. 2, the housing 104 includes a drain opening 148 that is orientated and sized to receive a complementary drain plug 126 from the filter element 102. The drain opening 148 allows fluid, such as water, to flow from the filter element 102 to the drain 108. As will be appreciated, if a filter element 102 is installed that has a drain plug 126 at a different diameter (e.g., orientation) and/or a wider size than the drain opening 148, the filter element 102 will be unable to be properly installed into the housing 104.

Figure 3B:
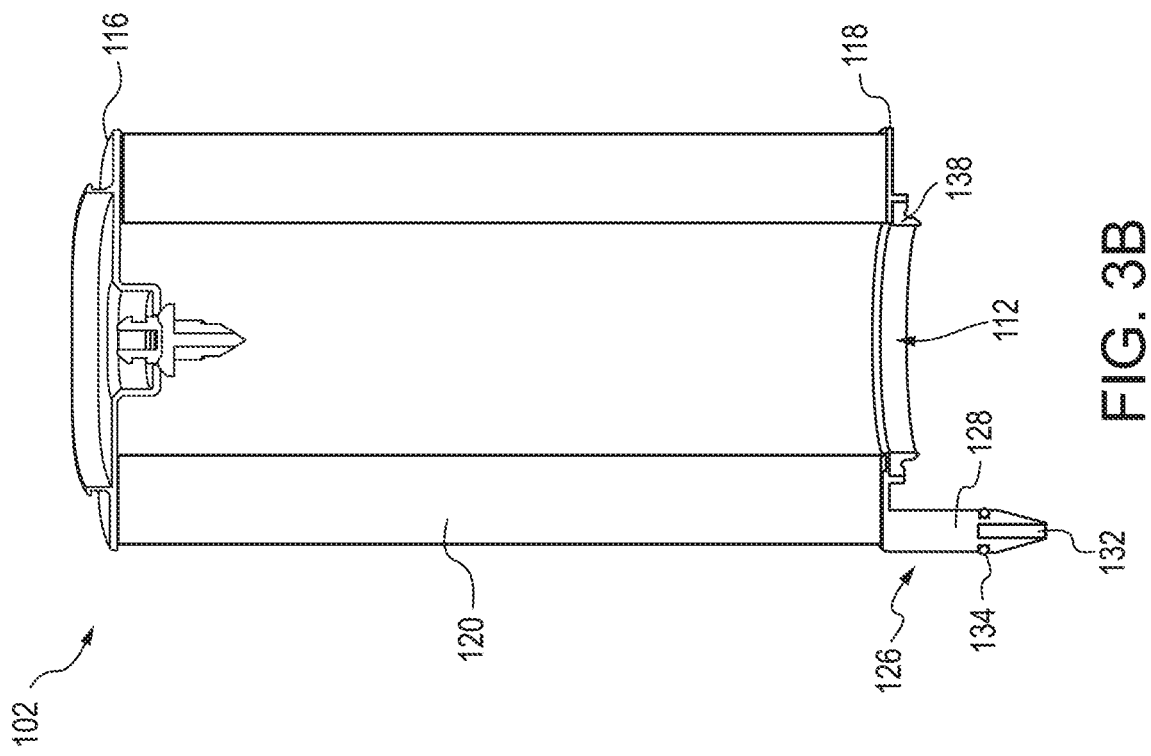
FIG. 3B is a cross-sectional view of the filter element of FIG. 3A.
Figure 3A:
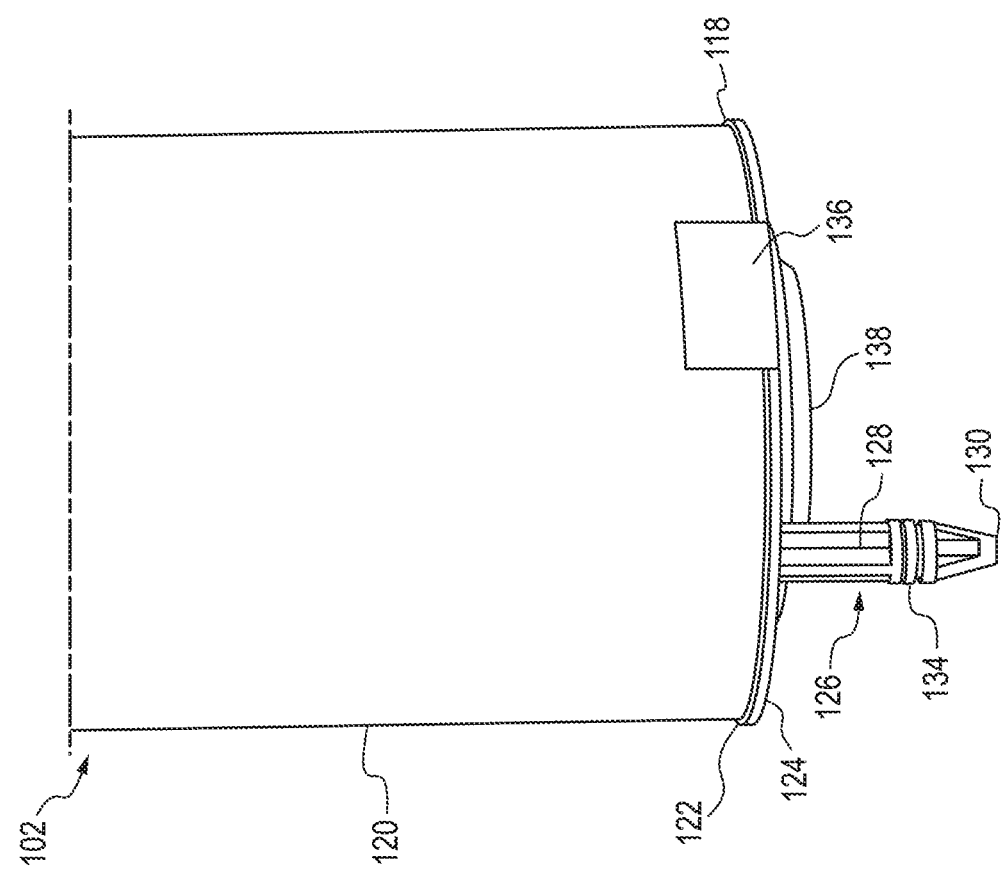
FIG. 3A is a perspective view of a portion of a bottom of a filter element of the filtration system of FIG. 1 according to an example embodiment.

As shown in FIGS. 3A and 3B, a perspective view and a cross-sectional view of the filter element 102 that includes the drain plug 126 is shown, according to an example embodiment. The filter element 102 includes a first endplate 116, a second endplate 118, and filter media 120 disposed between the first endplate 116 and the second endplate 118. The filter element 102 may be a cylindrical filter element with similarly shaped components. The filter media 120 is positioned between and extending axially between the first endplate 116 and the second endplate 118. While the filter element 102 in FIG. 3B is shown without a centertube, in some embodiments, the filter element 102 may include a centertube. As will be appreciated, a filter element 102 without a centertube will need to limit the compression force (e.g., installation force) and, relatedly, the gasket compression along the various gaskets implemented in the filter element 102.

The filter media 120 defines a central opening that extends axially therein and is in fluid communication with the outlet 112. The filter media 120 includes an inner clean (e.g., filtered fuel) side and an outer dirty (e.g. unfiltered fuel) side. Accordingly, the filter element 102 is an outside-in flow filter element. In an alternative arrangement, the filter element 102 is an inside-out flow filter element having an inner dirty side and an outer clean side. Fluid to be filtered passes from the dirty side of the filter media 120 to the clean side of the filter media 120. The filter media 120 may include any of paper-based filter media, fiber-based filter media, foam-based filter media, synthetic filter media, pleated filter media, or the like. Pleated filter media refers to filter media 120 that is folded along a plurality of bend lines extending axially along an axial direction between an upstream inlet and a downstream outlet. In some embodiments, a flat sheet of filter media is alternately folded along a plurality of pleat fold lines, thereby defining a pleat block. The pleated filter media may include a plurality of wall segments extend in serpentine manner between the bend lines and define axial flow channels therebetween.

The first endplate 116 is adjacent to the first housing end 140 and, once installed, the lid 106. As shown in FIG. 3B, the first endplate 116 is a closed endplate and the second endplate 118 is an open endplate. The second endplate 118 is substantially flat and is configured to engage a substantially flat housing end when the filter element 102 is installed within the housing 104. The second endplate 118 includes a first end 122 adjacent the filter media 120 and a second end 124 disposed axially away from the first end 122 and the filter media 120. The second end 124 includes a seal between the second endplate 118 and the second housing end 142 causing the filter element 102 to be sealingly engaged with the housing 104. The seal 138 between the second endplate 118 and the second housing end 142 may be produced by an O-ring or other resilient seal and may be overmolded around the opening of the lip on the second endplate 118. A baffle 136 extends axially around a portion of the perimeter from the first end 122 in the direction of the filter media 120 and is disposed outside of the filter media 120. As discussed in greater detail below, the baffle 136 is located on the second endplate 118 such that it is adjacent to the inlet 110 when the filter element 102 is properly installed in the housing 104. The drain plug 126 extends axially from the second end 124 in a direction away from the filter media 120. As is readily apparent, the filter element 102 has a single, "known" orientation when installed into the housing 104, as the drain plug 126 can only be installed into the drain opening 148 in a single way. Accordingly, the filter element 102 will have the same orientation when installed into the housing 104. In some embodiments, when the filter element 102 is properly installed within the housing 104 (e.g., drain plug 126 disposed within the drain opening 148) the second end 124 is adjacent the second housing end 142.

Figure 4A:
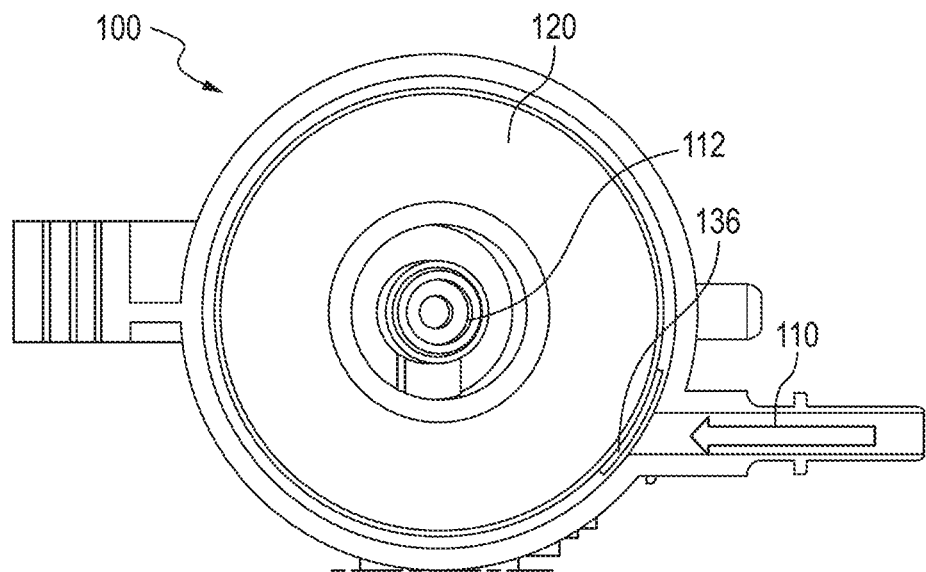
FIG. 4A is a top cross-sectional view of the filter element of FIG. 3A installed into the housing of FIG. 2.
Figure 4B:
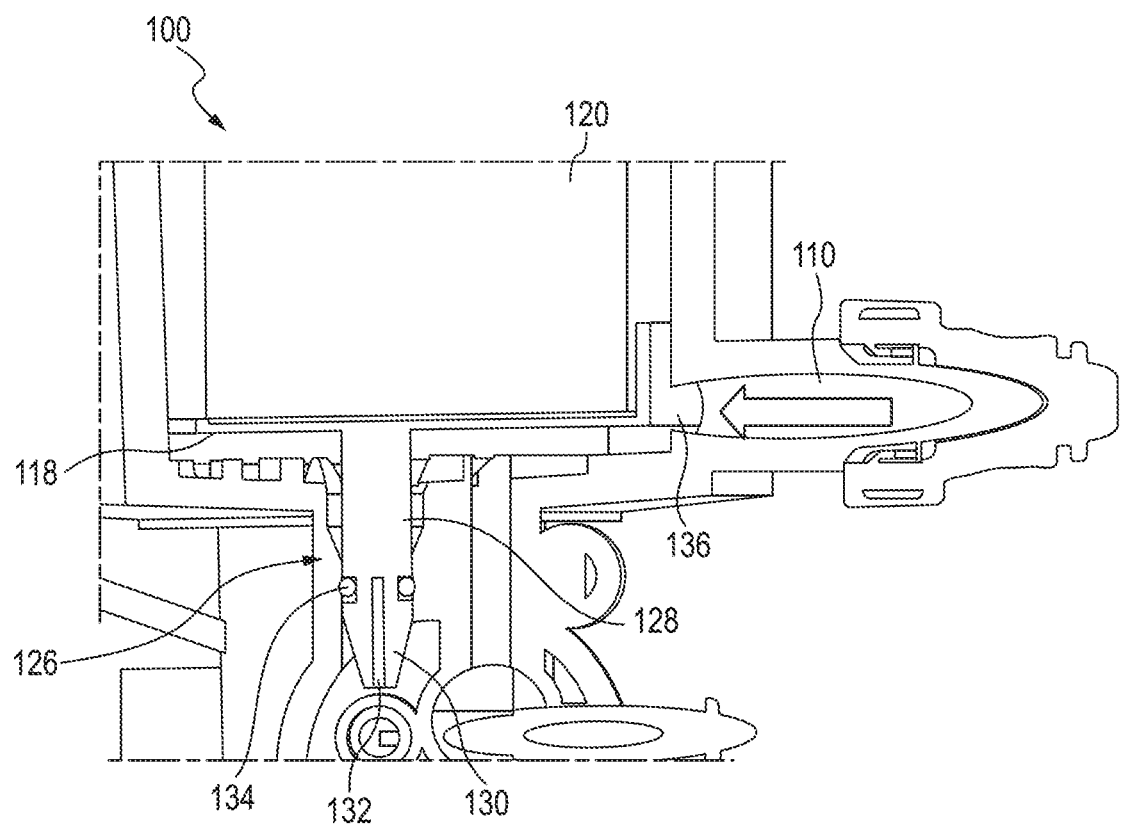
FIG. 4B is a cross-sectional side view of a portion of the filter element and housing of FIG. 4A.

The baffle 136 is configured to be adjacent to the inlet 110 such that the baffle 136 is disposed between the inlet 110 and the filter media 120. The baffle 136 is an axially projecting, rounded portion that extends from the first end 122 towards the filter media 120 (or first endplate 116). Beneficially, this prevents the inlet flow of fuel from having direct contact with the filter media 120 and reduces the possibility of damage or bunching of the media pleats in the location. Instead, the baffle 136 acts as a buffer of the incoming fuel from the inlet 110 causing it to radially disperse and travel through the filter media 120. As discussed above, the filter element 102 will have the same orientation when installed into the housing 104 dependent upon the location of the drain plug 126. Thus, the baffle 136 has a "known" location and is disposed along the perimeter of the second endplate 118 in a location that will always place the baffle 136 between the filter media 120 and inlet 110. Accordingly, and as shown in FIGS. 4A and 4B, the baffle 136 only extends around a portion of the perimeter of the second endplate 118 and is adjacent the inlet 110 and disposed between the filter media 120 and inlet 110. In other words, the baffle 136 does not extend all the way around the perimeter of the second endplate 118 (e.g., a complete ring) and is limited to the portion of the second endplate 118 that is adjacent the inlet 110. Beneficially, the baffle 136 is less resource intensive and is more amenable in the embedding process compared to a complete ring baffle design, while leaving more surface area of the filter media 120 exposed, thereby aiding filtration efficiency.

The drain plug 126 is configured to be positioned along the diameter of the second endplate 118 at a location to engage a complementary drain opening 148 in the housing 104. The drain plug 126 includes a shaft 128 with a v-shaped tip 130. A radial seal member 134 is disposed between the shaft 128 and the v-shaped tip 130. In some embodiments, the shaft 128 and the v-shaped tip 130 are formed as an integral unit with an indentation to receive the radial seal member 134. The radial seal member 134 forms a seal between the drain plug 126 and the drain opening 148. In some embodiments, the radial seal member 134 may be produced by an O-ring or other resilient seal. As will be appreciated, the small size of the radial seal member 134 limits the compression force (e.g., installation force) of the filter element 102 and, beneficially, limits the compression force applied on the filter media 120 during installation. In some embodiments, the radial seal member 134 is overmolded on the drain plug 126. In some embodiments, a fluid passageway 132 runs through center of the drain plug 126.

Figure 5A:
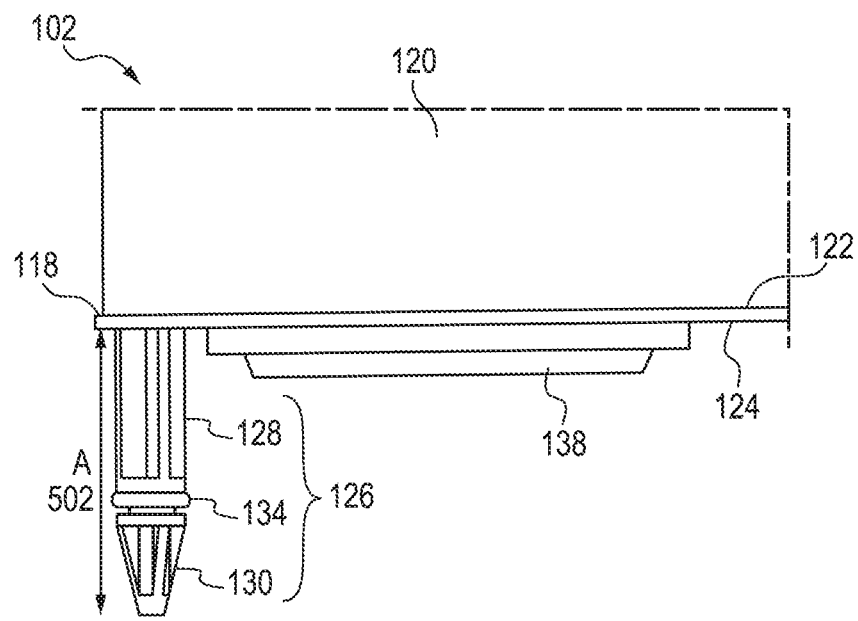
FIG. 5A is a side view of a portion of the filter element of the filtration system of FIG. 1.
Figure 5B:
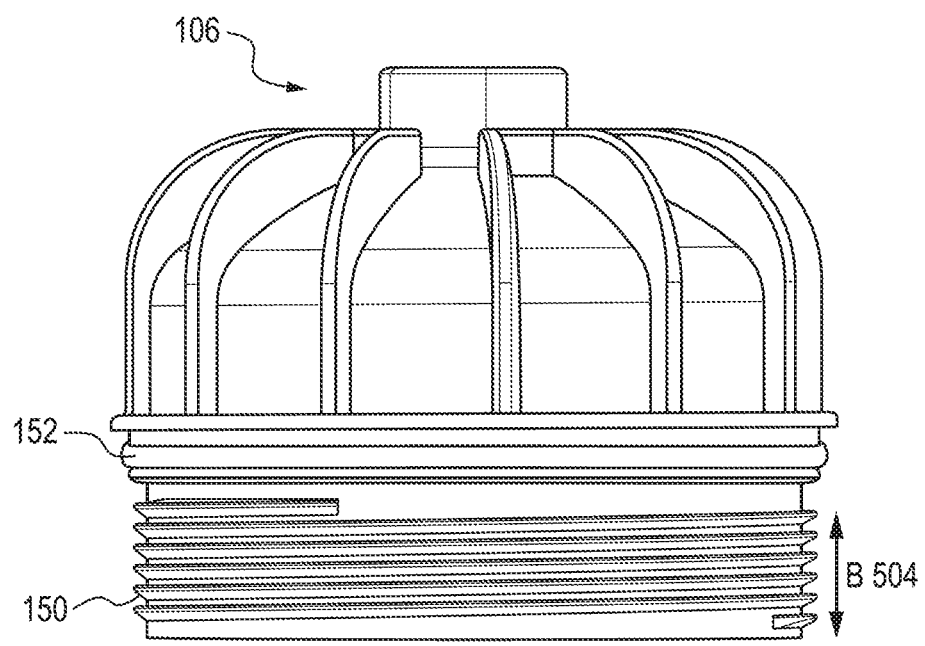
FIG. 5B is a side view of a portion of a lid of the filtration system of FIG. 1 according to an example embodiment.

As shown in FIGS. 5A and 5B, the length 502 of the drain plug 126 is related to the length 504 of the threaded lid member 150 of the lid 106. In some embodiments, the length 502 of the drain plug 126 is much longer than the length 504 of the threaded lid member 150 to ensure that the lid 106 is unable to properly engage the housing 104 unless the drain plug 126 is disposed within the drain opening 148. By having the drain plug 126 be longer than the connection surface between the lid 106 and housing 104, it ensures that the filtration system 100 cannot be properly sealed (e.g., lid 106 attached to the housing 104) unless the drain plug 126 is properly disposed within the drain opening 148. This is because the filter element 102 will be "taller" by the length of the drain plug 126, as the drain plug 126 is improperly engaging the second housing end 142 and increasing the overall length of the filter element 102, thereby preventing proper engagement of the lid 106 and the housing 104. Once the drain plug 126 is disposed within the drain opening 148, the drain plug 126 no longer keeps the filter element 102 from being disposed within the housing 104 and, in turn, the drain plug 126 no longer prevents the lid 106 from fully engaging the housing 104. In other words, the poke yoke on the filter element 102 is achieved in part due to the length 502 of the drain plug 126 being much greater than the length 504 of the threaded lid member 150 of the lid 106, as the greater length ensures that the drain plug 126 must be disposed within the drain opening 148 (and therefore no longer a substantial (or any) factor in extending the height of the filter element 102) before the lid 106 can be installed. In some embodiments, the length 502 of the drain plug 126 is 43 mm and the length 504 of the threaded lid member 150 is 4 mm and has a 9,5 pitch.

Figure 6A:
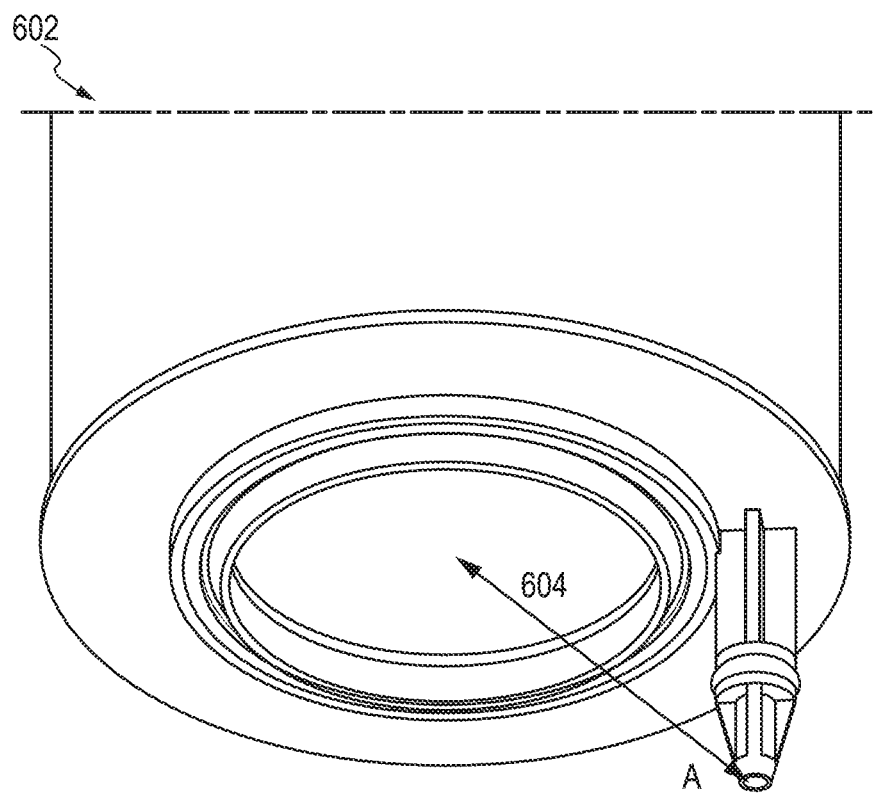
FIG. 6A is a bottom perspective view of a filter element according to another example embodiment.
Figure 6B:
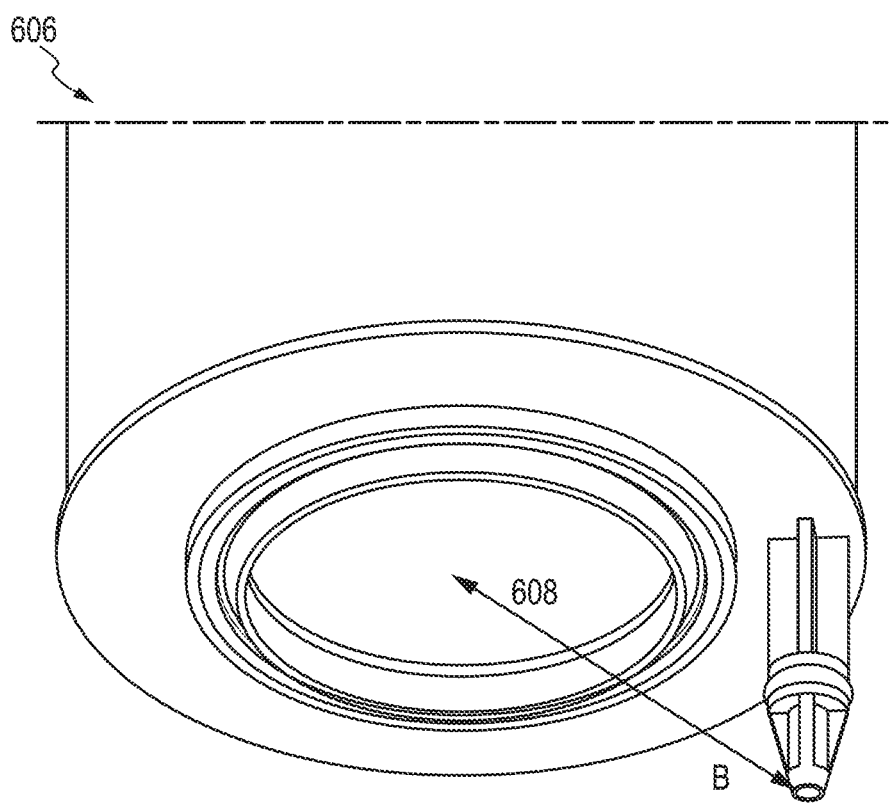
FIG. 6B is a bottom perspective view of a filter element according to yet another example embodiment.
Figure 7:
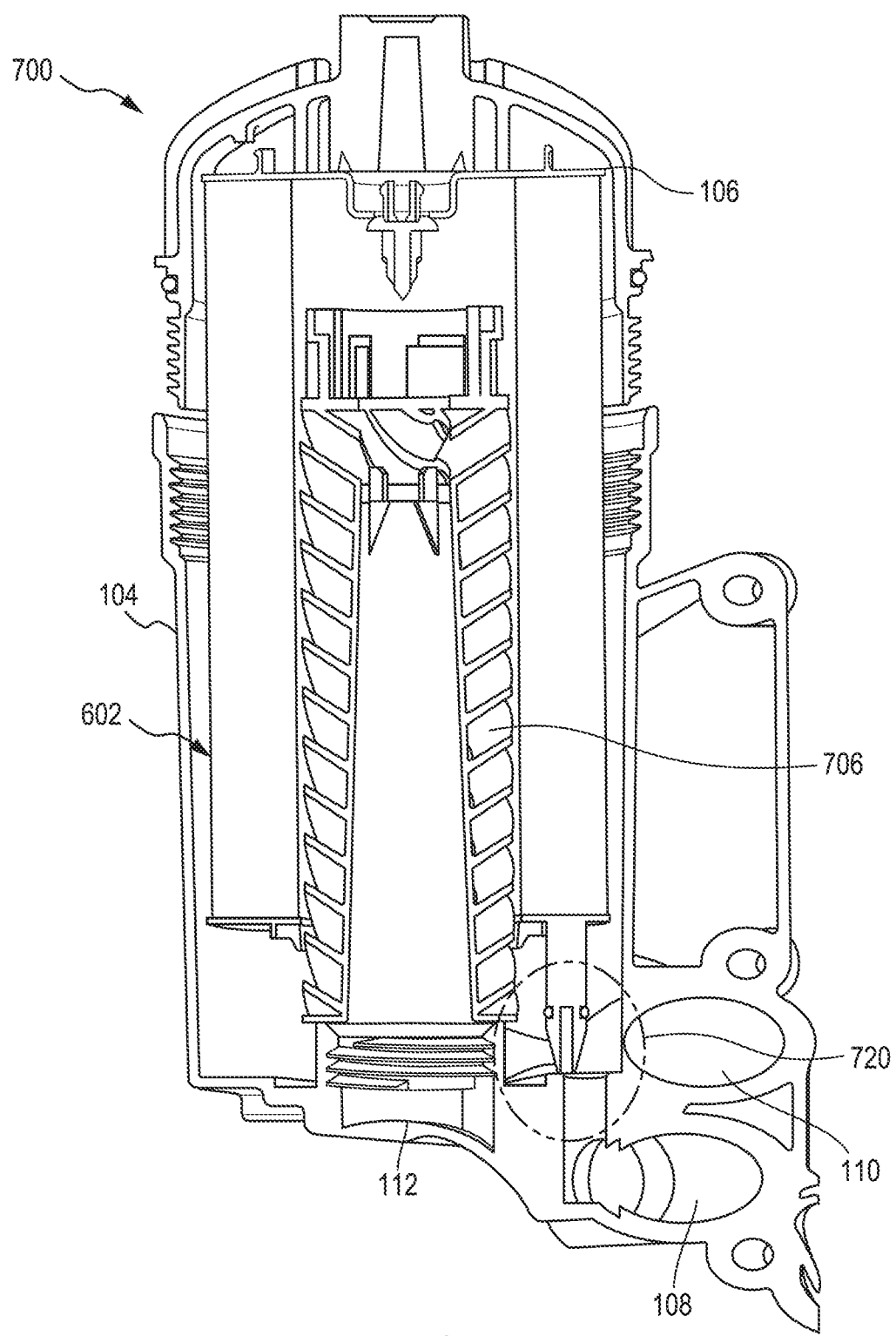
FIG. 7 is a cross-sectional side view of a filter element improperly installed into a filtration system according to an example embodiment.

FIGS. 6A and 6B show different placements of the drain plug 126 along the diameter of the second endplate 118. The filter element 602 of FIG. 6A has the drain plug 126 at a length 604 that is at a diameter of 90 mm, or 45 mm from the center, of the second endplate 118. The filter element 606 of FIG. 6B has the drain plug 126 at a length 608 that is at a diameter of 100 mm, or 50 mm from the center, of the second endplate 118. As shown in FIG. 7, if the filter element 602 is installed into a housing 104 that is keyed to the larger diameter location filter element 606, then the filter element 606 will not enter the drain opening 148. Specifically, an interference zone 720 occurs with the drain plug 126 and the second housing end 142. Consequently, the threaded lid member 150 of the lid 106 is unable to engage the threaded housing member 146 and the standpipe 706 is unable to engage the filter element 602.

Figure 8:
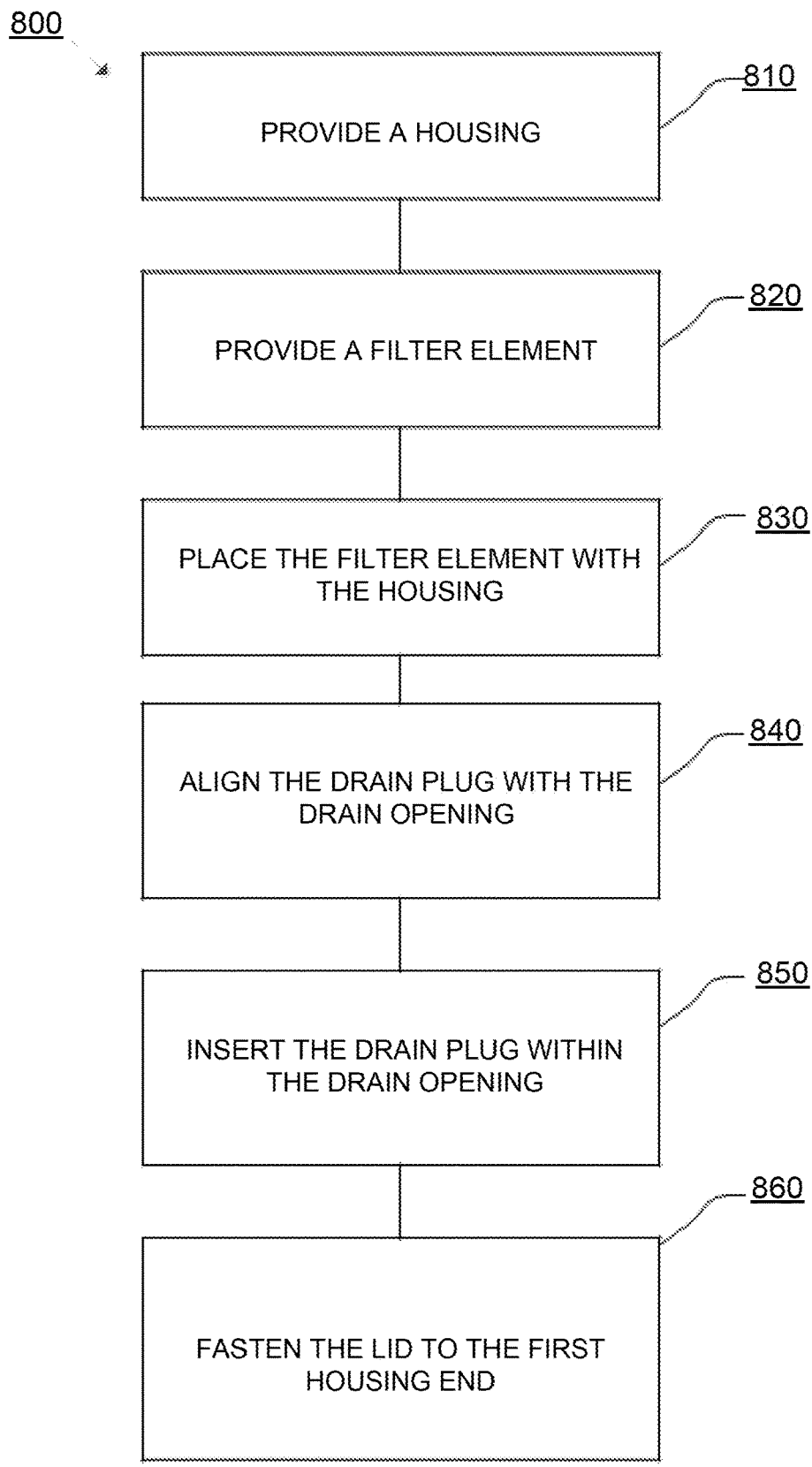
FIG. 8 is a method of installing a filter element into the housing according to an example embodiment.

Turning to FIG. 8, a method 800 of installing a filter element with a drain plug into a housing with a complementary drain opening is provided. The filter element may be the filter element 102 of FIGS. 1-5B or filter element 602 of FIGS. 6A-6B, and the housing may be the housing 104 of FIGS. 1-6B. Generally, the method 800 of installation includes a drain plug on the filter element positioned to plug a drain opening in the housing when the filter element is properly installed. Beneficially, the rotational position of the filter element is fixed when the drain plug is positioned within the drain opening, allowing for the positioning of a smaller baffle (that does not extend completely around the circumference of the filter media) in order to prevent the inlet flow of the filtration system from directly impacting the pleats of the filter media. Additionally, the drain plug has a minimum specified length, such that a lid (e.g., cover) of the filter housing cannot be properly installed unless the drain plug is correctly positioned within the drain opening. Further, the filter element and hosing do not include any type of ramping surface to facilitate installation, instead relying on the respective positions of the drain plug and the drain opening.

At 810, a housing is provided. The housing includes a first housing end, a second housing end, and a housing opening between the first housing end and the second housing end. The second housing end defines a drain opening. The second housing end is substantially flat (e.g., does not include a ramp poke yoke feature). The housing may also include an inlet and an outlet. The inlet is in fluid communication with an outside of a filter element, and the outlet is in fluid communication with a central opening of a filter element.

At 820, a filter element is provided. The filter element includes a first endplate and a second endplate defining an endplate opening. Filter media is positioned between and extending axially between the first endplate and the second endplate. The filter media defines a central opening extending axially therein. A drain plug axially protrudes from the second endplate in a direction away from the filter media. The second endplate is substantially flat (e.g., does not include a ramp poke yoke feature). The filter element may include a baffle on the second endplate. The baffle protrudes axially from the second endplate towards the first endplate and the baffle extends radially around a portion of a perimeter of the second endplate. The baffle only extends around a portion of the perimeter of the second endplate.

At 830, the filter element is placed within that housing opening of the housing. As will be appreciated, if the drain plug is not aligned with the drain opening, the filter element will protrude from the housing and will be misaligned (e.g., improperly installed). At 840, the drain plug is aligned with the drain opening. This alignment includes physically rotating either manually or otherwise, the filter element until the protruding drain plug comes in contact with the drain opening. Depending on the pressure applied to the filter element, at first contact the drain plug may begin to partially enter the drain opening.

At 850, the drain plug is inserted within the drain opening such that the filter element is fully disposed and installed within the housing. Upon installation, the baffle is disposed adjacent to the inlet and the baffle is disposed between the inlet and the filter media. Beneficially, the baffle prevents the inlet flow of fuel from having direct contact with the filter media and reduces the possibility of damage or bunching of the media pleats in the location. Additionally, the baffle leaves more surface area of the filter media exposed, compared to a full or half ring baffle, thereby aiding filtration efficiency.

At 860, a lid is fastened to the first housing end. The lid includes a threaded lid member configured to engage a complementary threaded housing member on the first housing end. The engagement of the threaded lid member and the threaded housing member occurs if the drain plug is fully disposed within the drain opening. The engagement of the lid and the first housing end is prevented from occurring when the filter element is positioned within the housing but the drain plug is not disposed within the drain opening. As will be appreciated, due to the length of the drain plug, if the drain plug is not properly disposed in the drain opening, the filter element will be separated from the housing by a distance equal to the drain plug.

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples).

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

As used herein, the term "substantially" means plus or minus 10% of any associated value or range of values.

References herein to the positions of elements (e.g., "top," "bottom," "above," "below," etc.) are merely used to describe the orientation of various elements in the FIGURES. It should be noted that the orientation of various elements may differ according to other example embodiments, and that such variations are intended to be encompassed by the present disclosure.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

What is claimed is:

1. A filter element comprising:
a first endplate;
a second endplate;
a filter media extending axially between the first endplate and the second endplate; and
a drain plug axially protruding from one of the first endplate or the second endplate in a direction away from the filter media, the drain plug configured to engage a drain opening of a housing and facilitate installation of the filter element into the housing.

2. The filter element of claim 1, further comprising:
a baffle protruding axially from one of the first endplate or the second endplate towards the filter media, the baffle extending radially around at least a portion of a perimeter of the second endplate.

3. The filter element of claim 2, wherein each of the drain plug and the baffle are located on the same one of the first end plate or the second plate.

4. The filter element of claim 2, wherein the filter media defines a central opening extending axially therethrough.

5. The filter element of claim 4, wherein an outside of the filter element is configured to be in fluid communication with an inlet of the housing and the central opening of the filter media is configured to be in fluid communication with an outlet of the housing when the filter element is installed within the housing, and wherein the installation of the drain plug into the drain opening causes the baffle to be adjacent to the inlet such that the baffle is disposed between the inlet and the filter media.

6. The filter element of claim 1, wherein the drain plug comprises a shaft and a v-shaped tip.

7. The filter element of claim 6, further comprising:
a seal member disposed between the shaft and v-shaped tip, the seal member configured to sealingly engage the drain opening.

8. The filter element of claim 7, wherein the seal member is a radial seal member overmolded on the drain plug.

9. The filter element of claim 1, wherein the drain plug is disposed at a distance between 40 and 50 mm from a center of the central opening and the drain opening is disposed at an identical distance from the center of the central opening.

10. The filter element of claim 1, wherein second endplate is substantially flat.

11. A filtration system, comprising:
a housing defining a drain opening;
a filter element positioned within the housing, the filter element comprising:
a first endplate,
a second endplate,
a filter media extending axially between the first endplate and the second endplate, and
a drain plug axially protruding from one of the first endplate or the second endplate in a direction away from the filter media, the drain plug configured to engage the drain opening, and
a baffle protruding axially from one of the first endplate or the second endplate towards the filter media, the baffle extending radially around at least a portion of a perimeter of the second endplate.

12. The filtration system of claim 11, wherein the drain plug facilitates installation of the drain plug into the housing.

13. The filtration system of claim 11, wherein each of the drain plug and the baffle are located on the same one of the first end plate or the second plate.

14. The filtration system of claim 11, wherein:
the filter media defines a central opening,
the housing further comprises an inlet and an outlet, the inlet in fluid communication with an outside of the filter element and the outlet in fluid communication with the central opening of the filter media, and
the installation of the drain plug into the drain opening causes the baffle to be adjacent to the inlet such that the baffle is disposed between the inlet and the filter media.

15. The filtration system of claim 14, wherein the portion around a perimeter of the first endplate of the second endplate that the baffle extends radially has a length at least equal to an inlet diameter of the inlet, and wherein the length is no greater than half the perimeter of the second endplate.

16. The filtration system of claim 11, wherein the lid comprises a threaded lid member configured to engage a complementary threaded housing member on the first housing end.

17. The filtration system of claim 16, wherein the threaded lid member has a first length and wherein the drain plug has a second length, the second length greater than the first length.

18. The filtration system of claim 11, wherein the drain plug comprises a shaft, a v-shaped tip, and a seal member disposed between the shaft and v-shaped tip, the seal member configured to sealingly engage the drain opening.

19. The filtration system of claim 18, wherein the seal member is a radial seal member overmolded on the drain plug.

20. The filtration system of claim 11, wherein the housing further comprises a drain and wherein the drain plug further comprises a fluid passageway therethrough, the fluid passageway in fluid communication with the filter media and a drain.

* * * * *